Jan. 19, 1937.　　　J. E. McALLISTER　　　2,068,145
TIME SWITCH
Filed Nov. 7, 1934　　　3 Sheets-Sheet 1

INVENTOR.
JOHN E. McALLISTER
BY
ATTORNEYS

Jan. 19, 1937.  J. E. McALLISTER  2,068,145
TIME SWITCH
Filed Nov. 7, 1934  3 Sheets-Sheet 2

INVENTOR.
JOHN E. McALLISTER
BY
Kwis Hudson & Kent
ATTORNEYS

INVENTOR.
JOHN E. MCALLISTER
BY
Kwis Hudson & Kent
ATTORNEYS

Patented Jan. 19, 1937

2,068,145

UNITED STATES PATENT OFFICE 2,068,145

TIME SWITCH

John E. McAllister, Cleveland, Ohio, assignor, by mesne assignments, to Arthur J. Hudson, Cleveland, Ohio Application November 7, 1934, Serial No. 751,859

7 Claims. (Cl. 200—39)

The present invention relates generally to time delaying mechanism and more particularly to a time switch for opening or closing a plurality of electric circuits in sequence after predetermined time intervals.

An object of the invention is the provision of a novel time delay actuating mechanism, more particularly a time switch embodying improved features of construction and operation which will increase the control, reliability and application thereof.

Another object of the invention is the provision of a novel time delay actuating mechanism for producing a plurality of desired operations after the elapse of predetermined time intervals, in which an actuating shaft is periodically rotated intermittently through an escapement mechanism controlled by a clock-driven means.

The invention resides in certain novel features and details of construction and combinations and arrangements of parts, and further objects and advantages thereof will be apparent to those skilled in the art to which it pertains from the following description of the preferred embodiment thereof, described with reference to the accompanying drawings, in which, Fig. 1 is a front plan view of a time switch embodying the present invention.

Similar reference characters designate corresponding parts throughout the several views of the drawings.

Figure 1:
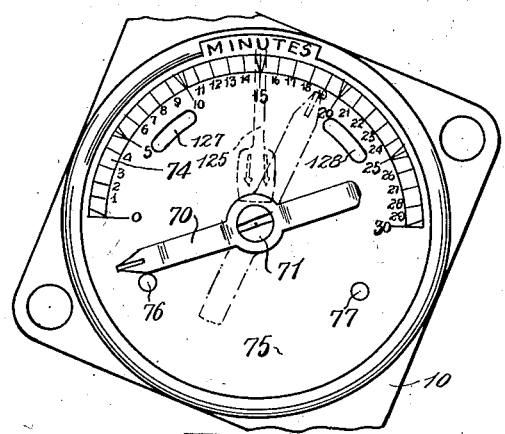

Briefly stated, the illustrated preferred embodiment of the invention, which is an electric time switch, comprises a spring actuated rotary switch operated through an escapement mechanism controlled from a rotatable shaft provided with a hand grasp for manual movement in opposite directions and adapted to be rotated in one direction by a clock mechanism. The hand grasp, which also serves as an indicator, is movable through a predetermined arc, and the escapement mechanism is actuated to produce one-half rotation of the switch in a plurality of steps upon each complete oscillation of the hand grasp.

Movement of the hand grasp in a clockwise direction winds both the clock mechanism and the switch actuating spring, and as the indicator reaches or passes the mark 30 at the end of the scale, the present time switch being a thirty minute switch, the escapement mechanism is actuated to rotate the switch a predetermined amount and close the same. As the indicator is returned towards the zero mark of the scale, either through manual operation or under the actuation of the clock mechanism, the escapement is again actuated as the indicator passes a predetermined point on the scale and the switch intermittently rotated in steps until it again reaches the open position. One of the advantages of this construction resides in the fact that the clock mechanism can be utilized to measure short intervals of duration, say up to 20 or 25 minutes in the present instance, without affecting the circuit, etc.

Referring to the drawings, the frame of the device illustrated comprises a base 10 of generally rectangular shape provided with a circular boss 11 formed integral therewith, a disc 12 supported in parallel spaced relation to the base 10 by a plurality of posts, 13, 14, 15 and 16, and a disc 17 supported in parallel spaced relation to the disc 12 by a plurality of posts 18, 19, 20, 21 and 22. The posts may be secured to the base 10 and the discs 12 and 17 in any convenient manner, and any desired arrangement of the posts may be employed within limits which will be hereinafter apparent.

The switch proper is housed between the base 10 and the intermediate plate 12, and comprises a rotary switch element consisting of a plurality of plates 28 and 29 fixed to an escapement ratchet or disc 30 by rivets 31 and insulated therefrom by insulation 32. The outer ends of the plates 28 and 29 project on opposite sides of the composition ring-shaped member 33, as illustrated in the drawings, to form a plurality of blades, in the present instance two, designated as 34 and 35, spaced 180° apart. Upon rotation of the rotary switch element, the blades 34 and 35 successively engage a plurality of stationary contacts 39 to 44 inclusive, positioned in cut out portions of the ring-shaped member 33. The stationary contacts are secured to the boss 11 by screws 46 and provided with electric connectors or terminal posts 47 formed integral with the contacts. Any arrangement of blades and contacts may be employed to meet the needs of a particular switching operation. The present embodiment is merely illustrative and a practical application thereof is hereinafter referred to.

Figure 3:
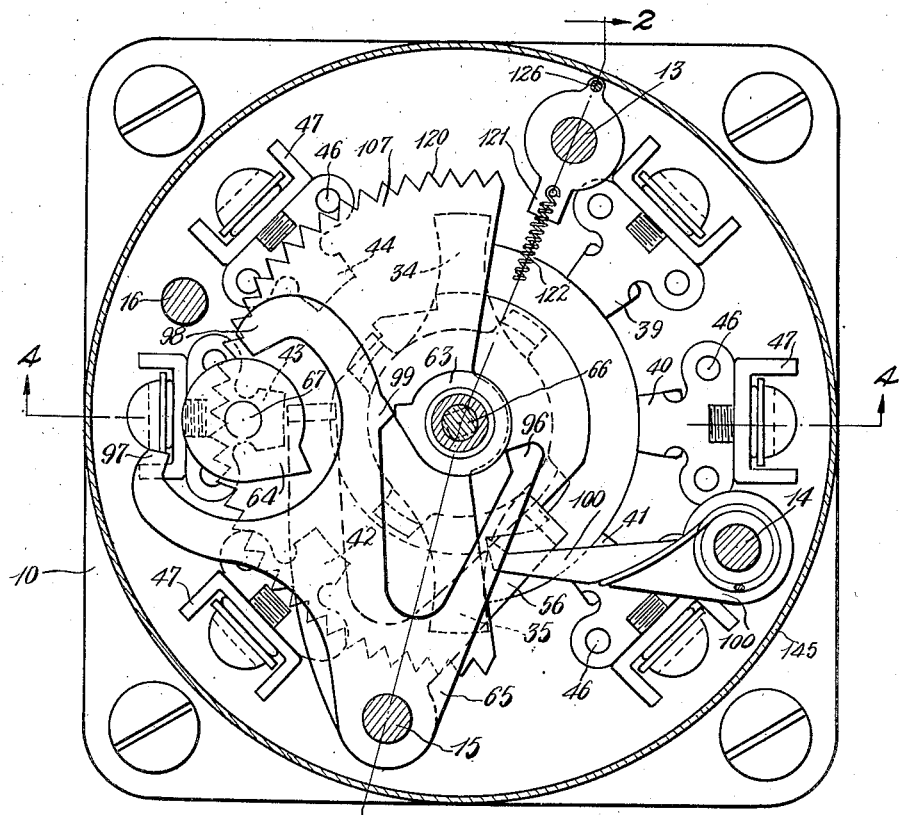
Fig. 3 is a section on the line 3—3 of Fig. 2 with the mechanism in the "off" position shown in Fig. 1.
Figure 8:
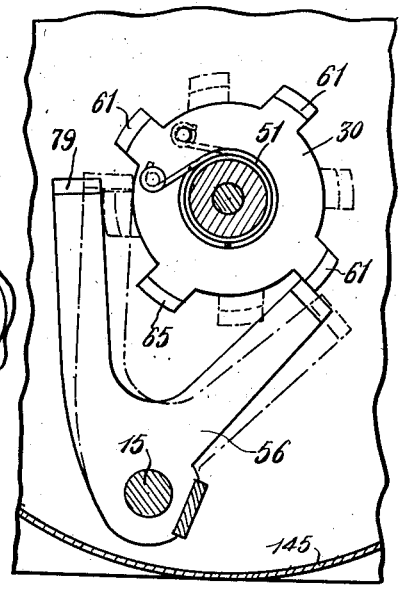
Fig. 8 is a section on the line 8—8 of Fig. 2, with the mechanism in the "off" position.

The rotary switch element consisting of the plates 28 and 29, and the escapement disc 30, which is provided with a downwardly extending boss 48, is rotatably supported on a central shaft 50, and rotated in a clockwise direction, as viewed in Figs. 3 and 8, by a helical spring 51 positioned about a collar member 52 rotatably supported on the upper end of the shaft 50. One end of the spring 51 is connected to a pin 53, secured to the escapement disc 30, and the other end to a pin 54 on a ratchet disc 55 riveted to the upper end of the collar member 52, which, as previously stated, is rotatably supported on the shaft 50. The shaft 50 is non-rotatably secured in the base 10 in any convenient manner, and, if desired, suitable means may be provided at the upper end of the shaft for retaining the collar member 52 in position thereon.

Rotation of the switch element under the action of the spring 51 is controlled by a bell-crank shaped escapement pawl 56, rotatably supported about the post 15. Opposite ends of the bell crank escapement pawl 56 are adapted to project alternately into the path of movement of a plurality of upstanding stops or lugs 61, in the present instance four, formed integral with the escapement disc 30 to permit an intermittent rotation of the rotary switch element in steps of 45°. The operation of the escapement pawl 56 is under the control of two small cams 63 and 64 through the medium of a double forked or double Y-shaped lever 65 formed integral with the escapement pawl 56 and rotatably supported on the upper end of the post 15. The cams 63 and 64 are secured to the squared ends of shafts 66 and 67 rotatably supported in the discs 12 and 17.

The central shaft 66 is adapted to be oscillated through an arc of approximately 210° to 215° by a combination hand grasp and pointer 70 secured to the outer tapered end thereof by a flanged cap nut 71, rotatably supported in the hand grasp with the flange 72 positioned between a shoulder on the hand grasp proper and a tapered member 73 pressed into the hand grasp. The member 73 is secured on the tapered end of the shaft 66 by a forced fit and the construction permits the same to be readily secured to and removed from the taper for the purpose of assembly and adjustment of the pointer with reference to a scale 74 on a cover plate 75 spaced from the outer disc 17 and secured thereto in any convenient manner. A pair of positive stops 76 and 77, in the present instance secured to the outer disc 17 and projecting through the cover plate 75, are provided for limiting the movement of the combination hand grasp and pointer 70.

As the combination hand grasp and pointer is moved in a clockwise direction from the position shown in Fig. 1, which is referred to as the "off" position of the switch, the escapement pawl 56 is rocked from the position shown in full lines in Fig. 8 to that shown in dot-dash lines in the same figure, which latter positon is reached as the pointer reaches or passes the "30" mark on the end of the scale 74, the present embodiment being a 30 minute time switch. The stop 61 in engagement with the leading end of the pawl 56, is thereby permitted to advance 45° under the action of the spring 51, or until the stop 61 next in advance thereof engages with or is caught by the turned up end 89 on the trailing end of the escapement pawl. The escapement disc 30 carries the switch plates 28 and 29 therewith, engaging the blades 34 and 35 with the stationary contacts 39 and 42, respectively. This position of the switch is hereinafter referred to as the "high" position.

Upon movement of the combination hand grasp and pointer in the reverse direction the stop 61 is released from the upturned end 79 of the trailing end of the escapement pawl 56, as the pointer reaches or passes the "20" mark on the scale, and the rotary switch element rotated another 45° or until the next following stop 61 engages the leading end of the escapement pawl. In this position, which is hereinafter referred to as the "medium" position of the switch, the blades 34 and 35 engage the stationary contacts 40 and 43, respectively. Upon continued movement of the pointer toward the zero end of the scale, the escapement pawl is again given a complete oscillation to advance the rotary switch element first 45° to what is hereinafter referred to as the "low" position of the switch with the blades 34 and 35 engaging the stationary stops 41 and 44, respectively, and then another 45° to the "off" position.

The two oscillations of the escapement pawl 56 for each cycle of operation of the switch, are effected by, or under the control of cams 63 and 64, the latter of which is secured to the lower squared end of the shaft 67, as previously stated. The cam 64 is rotated upon movement of the combination hand grasp and indicator 70 in a counter-clockwise direction in predetermined timed relation to the cam 63 through the medium of a gear 80 secured to the squared part 81 of the shaft 66 by a nut 82. The gear 80 is continuously in mesh with the gear 83 rotatably supported upon the upper end of the shaft 67 and operatively connected thereto through the medium of a one-way driving clutch. The one-way driving clutch comprises a member 84 slidably supported on the shaft 67 and keyed to the hub of the gear 83 by the engagement of two projections 85 formed on the hub in suitable slots in the member 84. A ratchet tooth or pawl 86 formed integral with the lower side of the member 84 is adapted to engage in a single slot or tooth space in the upper face of a disc member 87 keyed to the shaft 67. The member 84 is continuously urged in a downward direction as viewed in Fig. 4 to engage the ratchet tooth or pawl 86 in the slot in the disc member 87 by a compression spring 88, one end of which engages a shoulder on the member 84 and the other end the gear 83. The upper side of the gear 83 abuts a collar 89 on the shaft 67, thereby preventing the spring 88 from forcing the gear into engagement with the upper discs 17 which would increase the friction load on the clock mechanism, etc.

Figure 5:
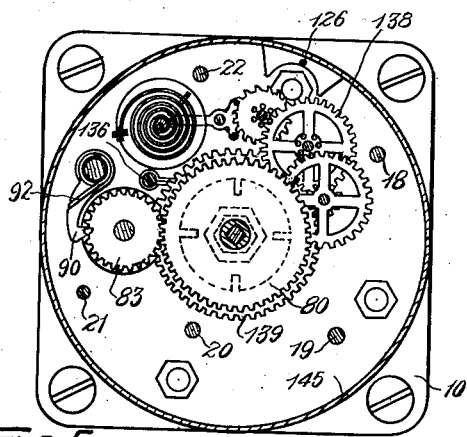
Fig. 5 is a section on the line 5—5 of Fig. 2, with the mechanism in the "off" position.
Figure 6:
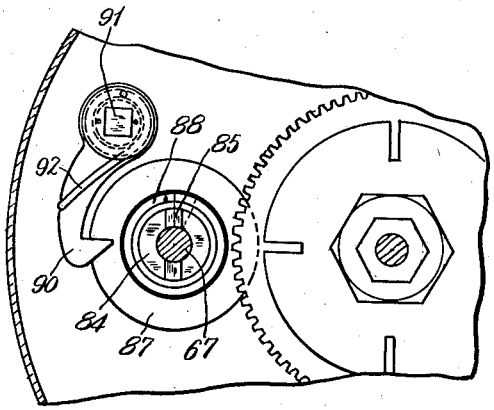
Fig. 6 is a section on the line 6—6 of Fig. 4.

Rotation of the cam 64, upon movement of the combination hand grasp and indicator 70 in a clockwise direction, as viewed in Fig. 1, is prevented by the engagement of a pawl 90 pivotally supported on a pin 91 projecting from the upper face of the disc 12 in a single ratchet tooth formed in the periphery of the disc member 87. The pawl 90 is continuously urged in a counter-clockwise direction, as viewed in Figs. 5 and 6, by a small spring 92, one end of which engages the pawl and the other end a member 93 secured to the upper end of the pin 91. The ratio of the gears 80 and 83 is such that the member 84 makes one complete rotation upon a complete movement of the combination hand grasp and indicator 70 in either direction.

From the foregoing description of the mechanism for rotating the cam 64, it will be apparent that upon movement of the combination hand grasp and pointer 70 in a clockwise direction, as viewed in Fig. 1, the ratchet tooth or pawl 86 rides over the upper surface of the disc member 87 and the cam 64 remains stationary, leaving the escapement pawl 56 under the sole control of the cam 63. As the indicator 70 reaches the end of the scale 74 the pawl 86 drops into the slot in the member 87. The pawl 86 overruns the slot slightly to assure proper operation of the device. Upon movement of the indicator in the reverse direction the cam 64 is driven through the one-way driving clutch and the escapement pawl 56 is under the combined control of both cams 63 and 64. The first movement of the escapement pawl 56 in its cycle of operation is effected as the indicator reaches the upper end of the scale by the engagement of the high part of the cam 63 with the end 96 of the member 65; the second movement by the engagement of the high part of the cam 64 with the end 97 of the member 65; the third movement by the engagement of the high part of the cam 64 with the end 98 of the member 65, and the fourth movement by the engagement of the high part of the cam 63 with the projection 99 on the member 65.

Figure 7:
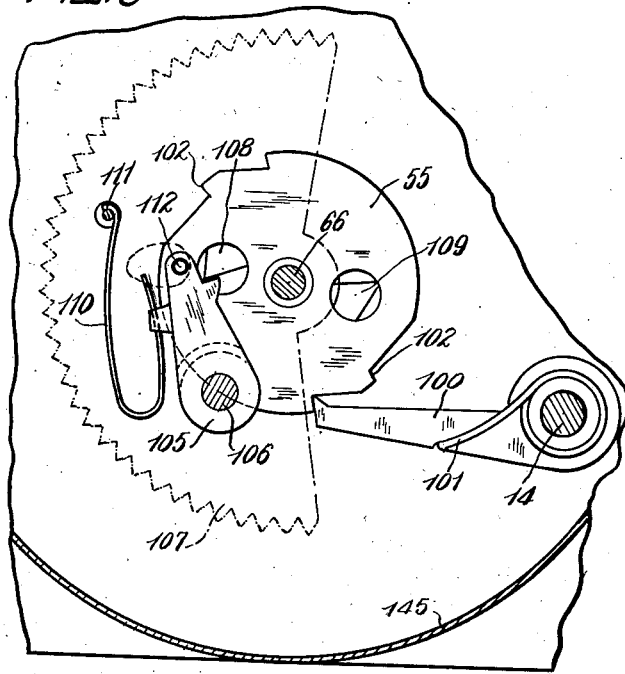
Fig. 7 is a section on the line 7—7 of Fig. 2, with the mechanism in the "off" position.

Rotation of the ratchet disc 55 in a direction to unwind the spring 51 is prevented by the engagement of a pawl 100 in one of a plurality of groups of ratchet teeth 102 formed in the periphery of the ratchet disc 55. The pawl 100 is rotatably supported on a reduced portion of the post 14, and is continuously urged in a clockwise direction, as viewed in Figs. 3 and 7, by a spring 101, one end of which engages in a notch in the pawl 100 and the other end in an aperture in the disc 12. Upon each complete movement of the combination hand grasp and indicator 70 in a clockwise direction, as viewed in Fig. 1, the ratchet disc 55 is advanced approximately 180° by the engagement of a pawl 105, rotatably supported on a member 106 projecting from the underside of a segment 107 secured to the lower squared end of the shaft 66, with one of two abutments 108 and 109 projecting upwardly from the disc 55. The pawl 105 is continuously urged in a direction to engage the abutments 108 and 109 by a wire spring 110, secured to the rear side of the pawl 105 and a pin 111 projecting downwardly from the underside of the segment 107. Movement of the pawl 105 in a clockwise direction, as viewed in Fig. 7, is limited by a pin 112 secured thereto which engages one side of an elongated aperture 113 in the segment 107. The cam 63, previously referred to, and the segment 107 are secured to the squared end of the shaft 66 by a nut 114 threaded on the lower end of the shaft. Suitable spacers 115 are positioned between the cam 63 and the segments 107 to properly locate the same.

The segment 107 is provided with a plurality of ratchet teeth 120 adapted to be engaged by a double faced pawl 121 rotatably supported on a reduced portion of the post 13, after the combination hand grasp and pointer is moved any appreciable distance from either of the stops 76 and 77. This construction prevents reverse movement of the hand grasp or pointer without the same having been moved through its complete arc in either direction. As the hand grasp reaches the end of its movement in either direction, the pawl 121 disengages the segment 107 and is held thereafter in a midposition by a spring 122, one end of which is secured to the pawl and the other end to the disc 12. This mechanism is referred to as the full wind mechanism, and prevents the switch from being operated without the spring 51 being completely wound. When the hand grasp has been moved in a clockwise direction a predetermined distance it cannot be reversed until the pawl 100 has engaged the next following groups of ratchet teeth 102 on the ratchet disc 55, and when the hand grasp has been moved in the opposite direction, it cannot be reversed before the pawl 105 has engaged with the next following ratchet abutment 108 or 109 on the ratchet disc 55.

Upon the movement of the combination hand grasp and pointer 70 in a clockwise direction, the rotary switch element indexes or snaps to the "high" position as the pointer reaches the end of the scale. At the time the rotary switch element snaps to the "high" position, the full wind pawl 121 is in engagement with the ratchet teeth 120 on the segment 107 and the rotary switch element will remain in this position indefinitely or until the combination hand grasp and pointer 70 is moved sufficiently to allow the pawl 121 to clear the end of the segment. This construction permits the device to be used as a straight snap switch, if desired.

Since after a predetermined movement of the hand grasp the same can only be turned in one direction because of the engagement of the pawl 121 in the ratchet teeth 120 of the segment 107, visible means is provided for indicating the direction of movement of the hand grasp. This means comprises a member 125 secured to the upper end of the small rod 126 welded or otherwise fixed to the pawl 121 and provided with a plurality of arrows visible through a plurality of slots 127 and 128 in the cover plate 75.

Figure 2:
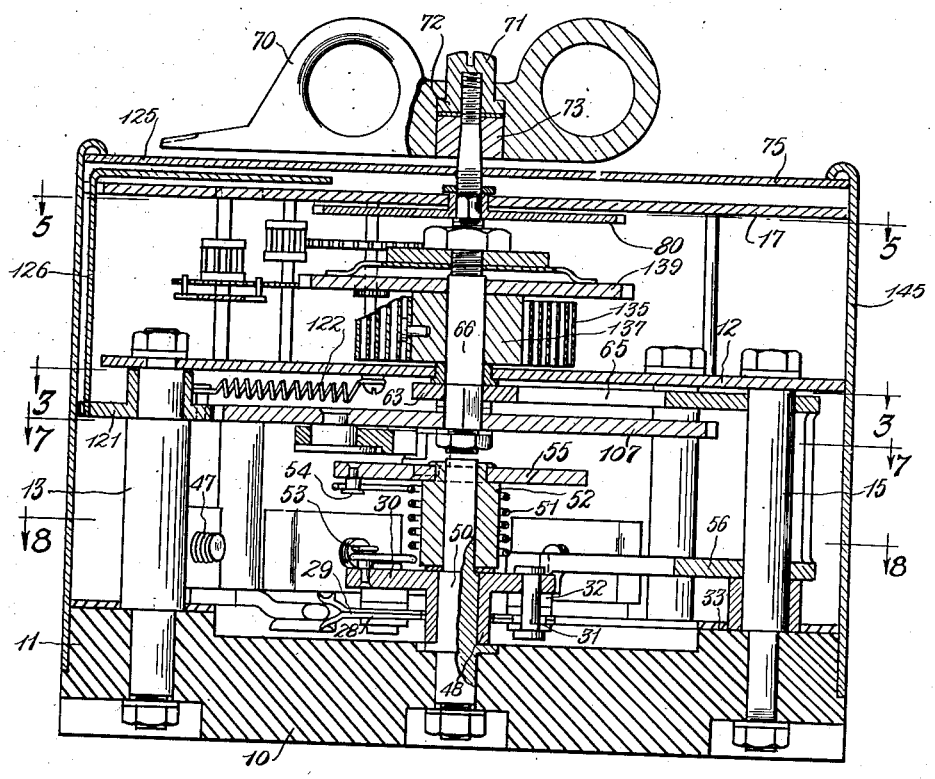
Fig. 2 is a section on the line 2—2 of Fig. 1 with the indicator turned to the position shown in dotted lines.
Figure 4:
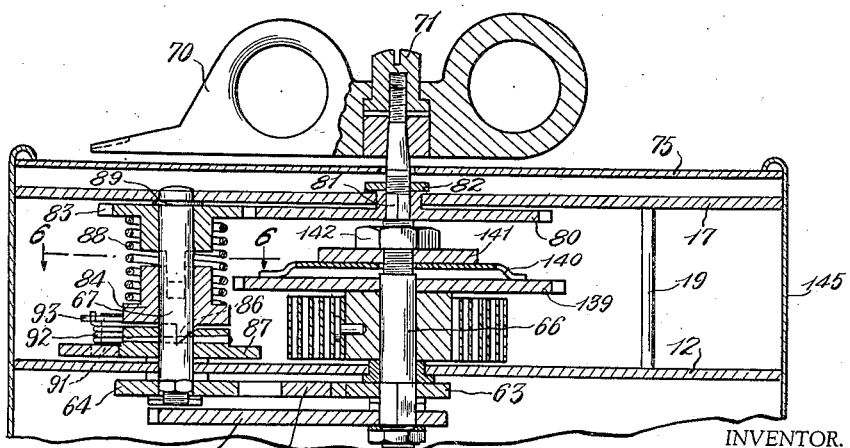
Fig. 4 is a section on the line 4—4 of Fig. 3.

The shaft 66 is adapted to be driven in a counter-clockwise direction, as viewed in Figs. 1, 2 and 4, by a clock spring 135 one end of which is secured to a post 136 and the other end to a collar member 137 fixed to the large portion of the shaft 66 by a force fit. Movement of the shaft 66 under the action of the spring 135 is controlled by a clock mechanism of conventional construction, designated in general by the reference character 138. The clock mechanism includes a gear 139 rotatably supported coaxially with the shaft 66 and operatively connected therewith through a friction drive which consists in clamping the gear 139 between a spring washer 140 and the collar member 137. The amount of friction between the gear 139 and the member 137 is determined by the tension of the spring washer 140 which can be adjusted by a nut 141 threaded onto the shaft 66 and held in any adjusted position by a jam nut 142. The operation of the foregoing mechanism is such that as the hand grasp is moved in a clockwise direction the clock spring is wound, and when the hand grasp is turned manually in the opposite direction, the frictional drive between the collar member 137 and the gear 139 allows the shaft 66 to turn independently of the clock mechanism. The entire operating mechanism of the device is enclosed in a metal cover 145 open at the top to expose the dial, etc.

Figure 9:
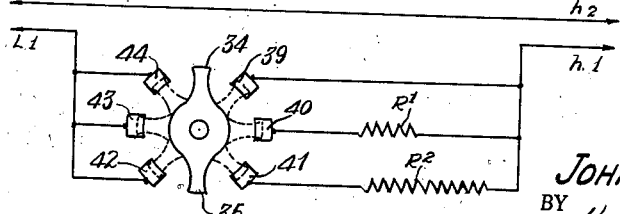
Fig. 9 is a schematic wiring diagram showing the device of Figs. 1 to 8 inclusive applied to a hair drying machine.

Fig. 9 is a schematic wiring diagram showing the present time switch applied to a hair drying machine. The stationary contacts 42, 43 and 44 are connected to one side of the line, designated at L₁ and the other side of the line L₂ goes directly to one side of the heater circuit designated as H₂. The stationary contact 39 is directly connected to the other side of the heater circuit designated as H₁. The stationary contacts 40 and 41 are connected to the H₁ side of the heater circuit of the hair drier through resistors R₁ and R₂ respectively. The resistors R₁ and R₂ are of predetermined amounts and the resistance of R₂ is considerably greater than that of R₁. The switch is shown in what is herein referred to as the "off" position in full lines in Fig. 9, and the dotted lines indicate the "high", "medium" and "low" positions of the switch. In the "high" position, the circuit to the heater is closed through the stationary contacts 39 and 42 by the switch plates 34 and 35 and full line voltage is applied to the heater circuit. In the "medium" position, the circuit is closed through the contacts 40 and 43, and the resistor R₁ which reduces the current in the heater circuit a predetermined amount. In the "low" position, the circuit is closed through the contacts 41 and 44 and the resistor R₂ which still further decreases the current supply to the heater circuit. In the "off" position, the heater circuit is open.

From the foregoing description of the preferred embodiment of the invention, it is believed that the operation thereof will be apparent. Suffice it to say that upon each complete cycle of oscillation of the combination hand grasp and indicator 70 the rotary switch element is indexed or rotated 180° in four steps of 45° each by the spring 51 under the control of the escapement pawl 56. Upon movement of the combination hand grasp and pointer 70 in a clockwise direction, the ratchet disc 55 is rotated approximately 180° to wind the spring 51 preparatory to being unwound by the aforesaid intermittent rotation of the switch element. In operation, the combination hand grasp and pointer 70 is given a complete turn in a clockwise direction to wind the escapement spring 51 and rotate the switch element to the "high" position, after which the pointer may be manually set to give a desired "high" heat interval. Thereafter, movement of the pointer toward the zero end of the scale is effected by the clock mechanism, and, as the pointer reaches the 20, 10 and zero marks of the scale, the rotary switch element advances or indexes first to the "medium", then to the "low", and finally to the "off" positions, respectively.

While the preferred embodiment of the invention has been illustrated as applied to a hair waving machine, it will be apparent to those skilled in the art that the invention is equally adaptable to other applications. It will also be apparent that numerous constructions of rotary contactors adapted to control one or more sides of a single circuit or a plurality of circuits can be substituted for the rotary switch element shown and any desired arrangement of circuits obtained. It will also be understood that the number of intermittent movements given to the rotary element, as well as the extent of each, may be varied as desired.

The invention resides in certain novel features and details of construction and combinations and arrangements of parts and this application is intended to cover all variations, adaptations, and uses thereof that come within the knowledge or customary practice of those skilled in the art to which it pertains, and I do not wish to be limited to the particular construction shown, which, as heretofore stated, may be varied within the scope of the invention, and I particularly point out and claim as my invention the following:

1. In a device of the character referred to, the combination of a rotary member, a second member rotatably supported coaxial with said first mentioned member, means for limiting the rotation of said second member, a coil spring operatively connected to said first and second members, an oscillatory member, means for oscillating said oscillatory member, means for preventing reverse movement of said oscillatory member upon limited movement thereof in one direction, a one-way driving connection between said oscillatory member and said second member, and means operatively connected to said oscillatory member for controlling the rotation of said first member under the action of said spring.

2. In a device of the character referred to the combination of a rotary member, a second member rotatably supported coaxial with said first mentioned member, means for limiting the rotation of said second member, a coil spring operatively connected to said first and second members, an oscillatory member, means for oscillating said oscillatory member, a one-way driving connection between said oscillatory member and said second member, and means operatively connected to said oscillatory member for effecting intermittent rotation of said first mentioned member under the action of said spring in a different number of steps upon movement of said oscillatory member in different directions.

3. In a device of the character referred to, the combination of a rotary member, a second member rotatably supported coaxially with said first mentioned member, means for limiting the rotation of said second member, a coil spring operatively connected to said first and second members, an oscillatory member, a clock mechanism for rotating said oscillatory member in one direction, a one-way driving connection between said oscillatory member and said second member, and means operatively connected to said oscillatory member for effecting intermittent rotation of said first member under the action of said spring in a different number of steps upon movement of said oscillatory member in different directions.

4. In a device of the character referred to, the combination of a rotary member, a second member rotatably supported coaxially with said first mentioned member, means for limiting the rotation of said second member, a coil spring operatively connected to said first and second members, an oscillatory member, means for oscillating said oscillatory member, a one-way driving connection between said oscillatory member and said second member, an escapement mechanism for controlling the rotation of said first member under the action of said spring, and means operatively connected to said oscillatory member and said escapement mechanism for actuating said escapement mechanism a different number of times upon movement of said oscillatory member in different directions.

5. In a device of the character referred to, the combination of a rotary member, a second member rotatively supported coaxial with said first mentioned member, means for limiting the rotation of said second member in one direction, a coil spring operatively connected to said first rotary member and said second member for rotating the former, an oscillatory member, means for oscillating said oscillatory member, a one-way driving means between said second member and said oscillatory member, an escapement mechanism for controlling the rotation of said first member, a plurality of cams operatively connected to said oscillatory member, and means operatively connected to said cams and said escapement mechanism for controlling the actuation of said escapement mechanism.

6. In a time switch of the character referred to the combination of a stationary contact, a rotary switch member, a second member rotatably supported coaxial with said rotary switch member, means for limiting the rotation of said second member in one direction, a coil spring operatively connected to the said rotary switch member and said second member for rotating the former, an oscillatory member, clock mechanism for rotating said oscillatory member in one direction, a one-way driving means between said second member and said oscillatory member, an escapement mechanism for controlling the rotation of said first member, and cam means operatively connected to said oscillatory member and said escapement mechanism for controlling the actuation of said escapement mechanism whereby said rotary switch member is intermittently rotated a different number of times upon movement of said oscillatory member in different directions.

7. In a time switch of the character referred to the combination of a stationary contact, a rotary switch member, a second member rotatably supported coaxial with said first mentioned member, means for limiting the rotation of said second member in one direction, a coil spring operatively connected to said rotary switch member and said second member for rotating the former, a main oscillatory shaft, clock mechanism for rotating said shaft in one direction, a one-way driving connection between said second member and said main shaft, escapement mechanism for controlling the rotation of said rotary switch member, an auxiliary shaft rotatably supported adjacent said main shaft, a one-way driving connection between said main shaft and said auxiliary shaft, a cam on said main shaft, a second cam on said auxiliary shaft, and means operatively connected to said cams and said escapement mechanism for actuating the latter.

JOHN E. McALLISTER.